United States Patent
Kauranen et al.

(10) Patent No.: US 7,415,274 B2
(45) Date of Patent: Aug. 19, 2008

(54) ROUTING PROCEDURE FOR A COMMUNICATION SYSTEM

(75) Inventors: Kari P. Kauranen, Helsinki (FI); Tony Hulkkonen, Vantaa (FI)

(73) Assignee: Nokia Corporation, Espoo (FI)

( * ) Notice: Subject to any disclaimer, the term of this patent is extended or adjusted under 35 U.S.C. 154(b) by 415 days.

(21) Appl. No.: 10/418,294

(22) Filed: Apr. 18, 2003

(65) Prior Publication Data
US 2004/0162077 A1 Aug. 19, 2004

Related U.S. Application Data

(60) Provisional application No. 60/447,752, filed on Feb. 19, 2003.

(51) Int. Cl.
*H04Q 7/20* (2006.01)
(52) U.S. Cl. .................. 455/435.2; 455/435.1
(58) Field of Classification Search .......... 455/445, 455/435.1, 435.2
See application file for complete search history.

(56) References Cited

U.S. PATENT DOCUMENTS

| | | | | |
|---|---|---|---|---|
| 6,097,951 | A * | 8/2000 | Ernam et al. ............... 455/433 |
| 6,112,087 | A * | 8/2000 | Tayloe ...................... 455/435.2 |
| 6,151,495 | A * | 11/2000 | Rune ........................ 455/426.1 |
| 6,631,260 | B1 * | 10/2003 | Carey et al. ................ 455/428 |
| 6,879,832 | B1 * | 4/2005 | Palm et al. .................. 455/445 |
| 6,950,419 | B1 * | 9/2005 | Park et al. .................... 370/338 |
| 7,006,450 | B2 * | 2/2006 | Kuster et al. ................ 370/252 |
| 2002/0068565 | A1 * | 6/2002 | Purnadi et al. .............. 455/436 |
| 2004/0097216 | A1 * | 5/2004 | Mademann ................. 455/410 |
| 2004/0157600 | A1 * | 8/2004 | Stumpert et al. ......... 455/432.1 |
| 2004/0176091 | A1 * | 9/2004 | Bajko et al. ............. 455/435.1 |
| 2004/0203640 | A1 * | 10/2004 | Molander et al. ........ 455/414.1 |

FOREIGN PATENT DOCUMENTS

| | | |
|---|---|---|
| EP | 1 280 365 A2 | 1/2003 |
| WO | WO 01/91370 A2 | 11/2001 |
| WO | WO 03/003771 A1 | 1/2003 |
| WO | WO 03/037021 A1 | 5/2003 |
| WO | WO 03/045095 A1 | 5/2003 |

* cited by examiner

Primary Examiner—Rasha S Al-Aubaidi
(74) Attorney, Agent, or Firm—Squire, Sanders & Dempsey L.L.P.

(57) ABSTRACT

A mechanism for performing routing in a communication system including a radio access network and a plurality of core networks connected to the radio access network. In order to accomplish a mechanism whereby the routing of a registration request to a serving core network, and also the rejection of a registration request, can be carried out in a controlled manner, a core network is first selected for a registration request received. The registration request is then forwarded to the selected core network and, in response to at least one predetermined criterion being fulfilled, the selected core network is notified that the registration request is to be served by that core network, i.e. that the registration request cannot be rerouted to another core network.

27 Claims, 7 Drawing Sheets

ROUTING PROCEDURE FOR A COMMUNICATION SYSTEM

REFERENCE TO RELATED APPLICATIONS

This application claims priority of U.S. Provisional Patent Application Ser. No. 60/447,752, entitled "Routing Procedure for a Communication System" filed on Feb. 19, 2003, the contents of which are hereby incorporated by reference.

BACKGROUND OF THE INVENTION

1. Field of the Invention

The invention relates generally to a communication system where a plurality of Core Networks (CNs) shares a common Radio Access Network (RAN). More specifically, the invention relates to a routing procedure in a system of the above-mentioned type. Since the Core Networks are typically operated by different operators, the system is termed a Multi-Operator Core Network (MOCN) in this context. Routing here refers generally to a process during which the RAN, in response to an initial message originated from a user terminal, selects a Core Network for the user terminal.

2. Description of the Related Art

The high price of the licenses for $3^{rd}$ generation mobile telephone networks (3G) together with the high cost of the $3^{rd}$ generation network infrastructure deployment requires innovative strategies in the development of the new network infrastructure. For a network operator, an effective way to reduce the investment costs and risks associated with this development is to share the new network infrastructure with other network operators. In many countries the authorities have become favorable for network sharing and allow network operators to form alliances in order to share a part of a network or even the whole network, provided that competition is not hampered.

In the current dynamic market place this development will increasingly result in partnerships and creative agreements between operators. This trend will also emphasize the need for tools that enable the implementation of various degrees of network sharing.

One way of sharing a network infrastructure is a solution where several operators share a common Radio Access Network. In a network like this, a common Radio Access Network is connected to several Core Networks, each being operated by a different operator. This concept is called a Multi-Operator Core Network (MOCN). Despite several operators, the user may, depending on his/her terminal capabilities, see the network as a single network, the identity of which is broadcast by the Radio Access Network.

From the point of view of an operator, the advantages of a MOCN infrastructure are, for example, as follows:

the MOCN allows independent dimensioning of the Core Networks;

the charging entities are located in the Core Network of each operator; and the MOCN allows complete control of the services provided and also a good control of the quality of service.

In a MOCN network, the Radio Access Network forwards an initial message originating from a user to one of the Core Networks. If the Core Network receiving the initial message from the Radio Access Network cannot serve the user in question, it informs the Radio Access Network accordingly, which then reroutes the initial message to another Core Network to see whether the user can be served by that Core Network.

One problem with the current MOCN networks relates to the rejection of service in a situation in which none of the Core Networks (i.e. operators) are able to provide service to a particular subscriber. In this situation, the last Core Network to which the initial message, which is a NAS (non-access stratum) message, is rerouted, does not know that the message has already been routed to all the other Core Networks of the MOCN and that the other networks are not able to serve the subscriber. Therefore, it is possible that the last Core Network initiates a new rerouting procedure, although no serving Core Network can be found. As there is currently no mechanism for handling these kinds of situations in the Radio Access Network, the Radio Access Network may alternately, upon receiving the service rejection from the last Core Network, release the signaling connection to the user terminal, without properly indicating the reason for the release. Therefore, the user terminal may, after entering the Mobility Management-Idle (MM-IDLE) or Packet Mobility Management-Idle (PMM-IDLE) state, start the whole procedure again.

The above problem typically exists when the subscriber tries to register with the network. The initial message originating from the terminal is therefore also termed a "registration request" in this context.

It is an objective of the invention to bring about a solution whereby it is possible to avoid the above-mentioned drawbacks.

SUMMARY OF THE INVENTION

In one embodiment of the present invention there is a mechanism whereby a MOCN routing procedure, and especially the rejection of a registration request can be carried out in a controlled manner so that unnecessary rerouting and registration attempts can be avoided.

In another embodiment of the present invention, the potentially serving Core Networks (i.e. the Core Networks that may possibly serve the registration request) are determined in the Radio Access Network. The Radio Access Network then forwards the request to the first one of these Core Networks. If the first Core Network indicates that it cannot serve the request, the Radio Access Network typically forwards the request to the next one of the potentially serving Core Networks. The Radio Access Network thus selects one potentially serving Core Network at a time, sends the request to the selected Core Network, and waits for the response before possibly selecting a new Core Network. If one of the Core Networks accepts the request, the routing process ends and the service continues in a normal manner, i.e. the user is served as in a single operator network.

The Radio Access Network, in one example, keeps track of the Core Networks to which the request has already been sent and which Core Networks are still available. Simultaneously, the Radio Access Network monitors whether at least one predetermined criterion is fulfilled. If so, the Radio Access Network notifies the selected Core Network that the registration request must be processed normally, i.e. as in a single operator network. The predetermined criterion can be a situation where there are no more Core Networks available for the registration request than the currently selected Core Network. However, the notification may also be triggered if a certain combination of two or more predetermined criteria is met. For example, the Radio Access Network may receive and analyze information from outside the RAN, such as status information from one or more other Core Networks, whereby the analysis may cause the RAN to decide that the currently selected Core Network must serve the registration request.

The invention includes, therefore, in one example, a method for performing routing in a communication system including a radio access network and a plurality of core networks connected to the radio access network. The method includes the steps of receiving a registration request in the radio access network, selecting a core network for the registration request, and forwarding the request to the selected core network. In response to at least one predetermined criterion being fulfilled, the selected core network is notified that the registration request is to be served by the selected core network.

In another example, the invention includes a system for performing routing in a radio access network. The radio access network can be connected to a plurality of core networks. The system includes a first interface means for receiving a registration request, a selection means for selecting a core network for the registration request, and transmission means for forwarding the registration request to the selected core network. Monitoring means monitor whether at least one predetermined criterion is fulfilled. Notification means, responsive to the monitoring means, notify the selected core network that the registration request is to be served by the selected core network.

Another embodiment of the present invention includes a core network element for a communication network. The communication network includes, for example, a radio access network and a plurality of core networks. The core network element includes a first interface means for receiving a registration request from a radio access network, and a decision-making means, responsive to the first interface means, for deciding whether the registration request is to be served by the core network to which the core network element belongs. Transmission means, responsive to the decision-making means, transmit a rerouting command to the radio access network. The rerouting command indicates that the registration request is to be routed to another core network. The first interface means are configured to receive a notification notifying that a certain registration request is to be served by the core network to which the core network element belongs.

Another embodiment of the present invention includes, for example, a mechanism that enables a MOCN to behave as a single network from the terminal point of view in the context of roaming. In other words, the present invention can, for example, assure that the MOCN behaves consistently in all circumstances so that rerouting can be hidden from the terminal and the MOCN appears in all circumstances as a single network from the terminal point of view.

In a further embodiment of the invention, a cause value can be carried in a reroute command transmitted from the Core Network. The cause value indicates why the relevant Core Network cannot serve the subscriber in question. The cause value(s) received from the Core Networks are transferred to the next Core Network in connection with a new routing attempt. In this way the Core Networks know why the registration request was rejected previously, and the user can be informed accordingly.

Other features and advantages of the invention will become apparent by reference to the following detailed description and accompanying drawings.

BRIEF DESCRIPTION OF THE DRAWINGS

In the following, the invention and its preferred embodiments are described more closely with reference to the examples shown in FIG. 1 to 9 in the appended drawings, wherein.

DETAILED DESCRIPTION OF THE INVENTION

Below, the invention and its preferred embodiments are described using the terms and concepts commonly used in association with a UMTS (Universal Mobile Telecommunication System) environment. However, it is to be noted that the present invention is not tied to a particular technology, such as UMTS, but can be applied to any MOCN network.

Figure 1:
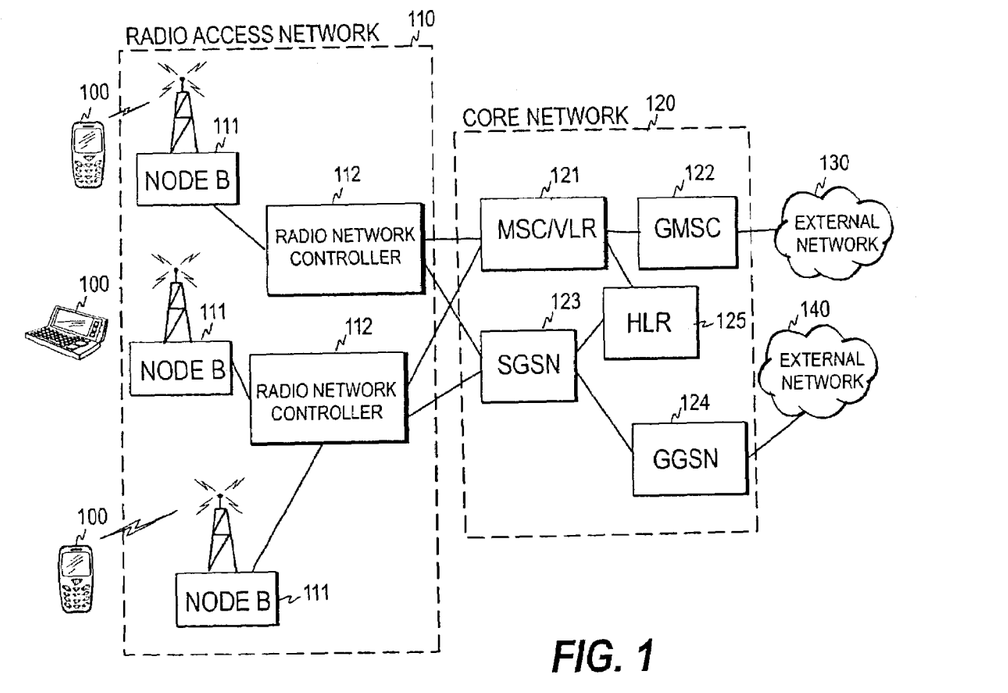
FIG. 1 illustrates a network architecture on which a MOCN according to the present invention may be based.

An MOCN network is illustrated with reference to FIGS. 1 and 2. FIG. 1 first illustrates a general UMTS architecture. As is commonly known, a UMTS network includes three interacting domains: User Equipment (UE), a Radio Access Network (RAN), and a Core Network (CN). In the figure, the Core Network is denoted by reference numeral 120, the Radio Access Network (such as UTRAN, Universal Mobile Telecommunication System Terrestrial Radio Access Network) by reference numeral 110, and the User Equipment is shown as a plurality of mobile terminals 100. In this context, the term "mobile terminal" refers to any terminal device (mobile equipment plus a subscriber identity module) which the user can control and which can communicate with the Radio Access Network. The mobile terminals can be connected via the Uu radio interface to node B elements 111, which are the physical units for radio transmission/reception in the cellular network. In addition to the node B elements, the Radio Access Network further includes Radio Network Controllers (RNC) 112, each of which can be connected through the Iu interface to a set of node B elements. Each Radio Network Controller is responsible for the control of the radio resources within its domain, i.e. in the set of node B elements connected to it. The Radio Network Controllers 112, which are connected through the Iu interface to the Core Network, form the service access points for the services the RAN provides to the Core Network 120.

The Core Network can be divided into circuit-switched (CS) and packet-switched (PS) domains, the former being responsible for the traditional circuit-switched services and the latter for packet-switched services. The circuit-switched domain can be connected via a Mobile Services Switching Center (MSC) 121 and the packet-switched domain via a Serving GPRS Support Node (SGSN) 123 to the Radio Access Network.

The MSC can include a Visitor Location Register (VLR), which is a database holding a copy of a visiting user's service profile and information on the location of the mobile terminal. The MSC/VLR can be connected through a Gateway MSC 122 to external circuit-switched networks 130, such as Public Switched Telephone Networks (PSTNs).

The SGSN can be connected to a Gateway GPRS Support Node (GGSN) 124, which connects the Core Network to external packet-switched networks 140, such as the Internet. The SGSN and the GGSN have functionalities similar to those of the MSC/VLR and GMSC, respectively, but in relation to packet-switched services. Some network elements of the Core Network, such as the Home Location Register (HLR) 125, are shared by both domains.

Figure 2:
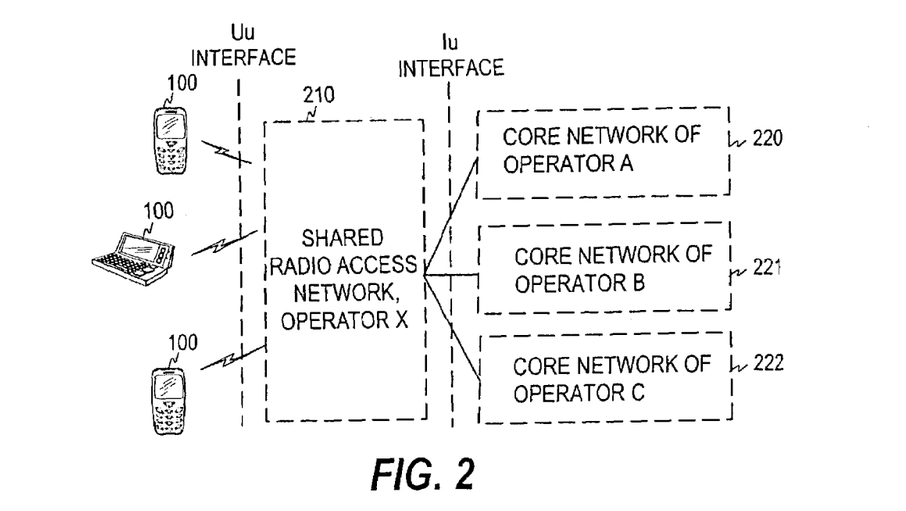
FIG. 2 illustrates an example of a MOCN network.

A network as shown in FIG. 1 may be shared by several operators, for example as is shown in FIG. 2. In this case, a common RAN 210 can be shared by three different operators, A, B, and C, each operating a Core Network of its own (Core Networks 220, 221, and 222, respectively). All the Core Networks can be connected to the same RNC of the shared RAN. In the network sharing scenario of FIG. 2, the shared RAN 210 may broadcast the PLMN (Public Land Mobile Network) identity "X" to the terminals, i.e. depending on its capabilities, the terminal may not see the identities of the different Core Network operators. However, it is also possible that the operators have dedicated radio frequencies, whereby they can transmit their own Mobile Network Codes (MNC) on their dedicated carriers.

As in the network of FIG. 1, the Radio Resource Control (RRC) handles the signaling over the Uu interface and the Radio Access Network Application Part (RANAP) handles the signaling over the Iu interface.

Figure 3:
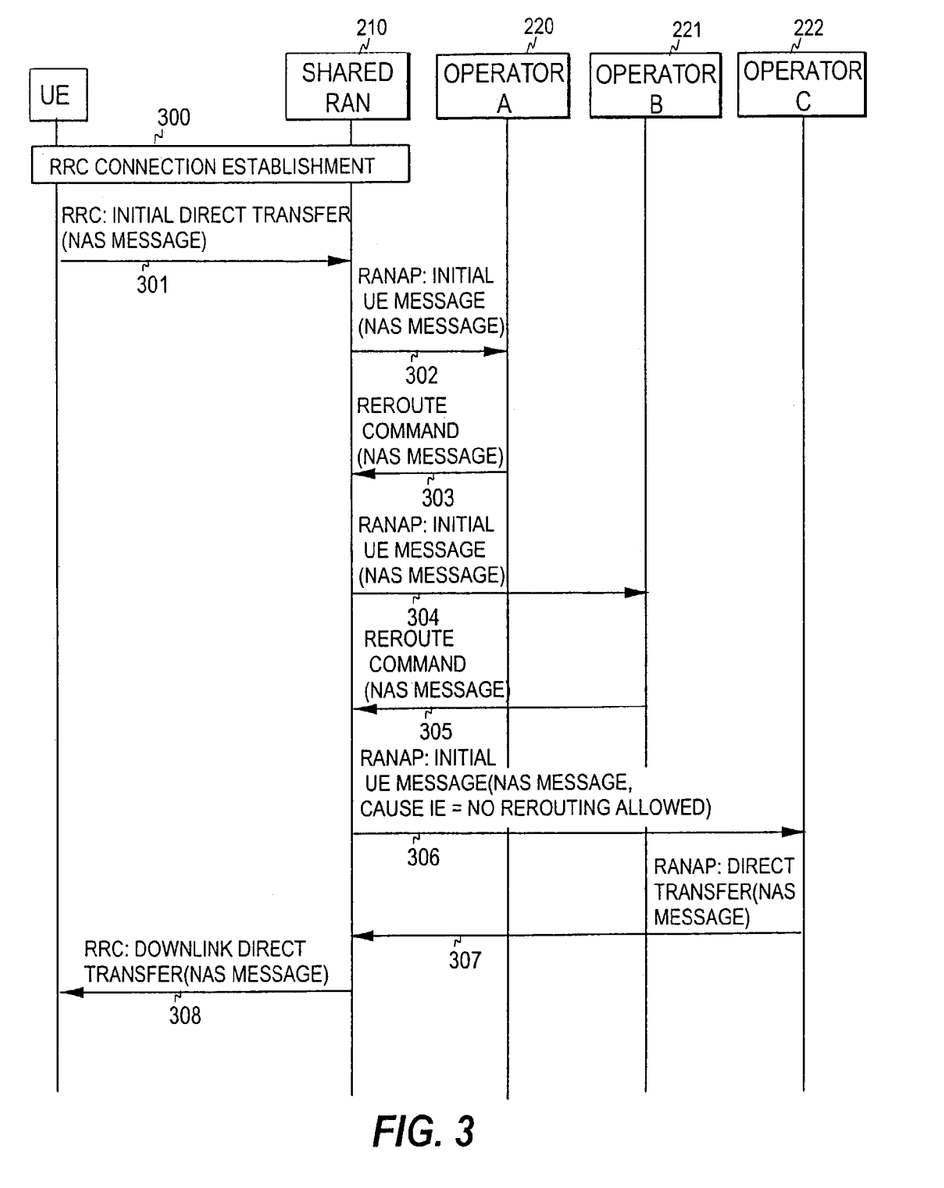
FIG. 3 illustrates the message exchange in a first embodiment of the invention.

FIG. 3 illustrates a first embodiment of the invention by showing the message exchange between the different entities in FIG. 2. As mentioned above, the RRC can be used in UMTS for connecting the terminal with the Radio Access Network. Therefore, when a user enters the network, an RRC connection must first be established across the Uu interface (step 300). The terminal then uses the initial direct transfer procedure to carry the initial message, which is a Non-Access Stratum (NAS) message to be transferred transparently through the RAN to the CN, over the radio interface to the RAN (step 301). The NAS message is the above-mentioned registration request, which in connection with registration may be a Location Updating Request, a Routing Area Update Request, or an attach message (PS attach or CS attach), for example.

The RNC then initiates the Initial UE message procedure according to the RANAP protocol, and forwards the NAS message first to the Core Network 220 of operator A in an initial UE message including the NAS message (step 302). It is assumed here that Core Network 220 cannot serve the request, whereby the Core Network returns a reroute command to the RNC (step 303). The reroute command is a message according to the RANAP protocol, the type (Information Element) IE of the message indicating that a reroute command is in question.

The RNC then selects the Core Network of operator B and repeats the sending of the NAS message, this time to Core Network 221 (step 304). It is further assumed here that Core Network 221 cannot serve the request either, whereby it returns a reroute command to the RNC (step 305), just as CN 220 did. In response to the second reroute command, the RNC notices that there is only one potentially serving Core Network left and repeats the sending of the NAS message, this time to Core Network 222 (step 304). However, as the RNC has noticed that this is the last available Core Network that can still serve the registration request, the RNC indicates in the message that the Core Network is not allowed to reroute the request. The insertion of the "no rerouting allowed" information into the message may be implemented by inserting a cause IE according to the RANAP into the initial UE message, for example, the cause IE indicating that "no re-routing is allowed". Instead of a new cause IE value the "no rerouting allowed" information may also be carried by a separate new parameter inserted into the message. When the Core Network receives this message, it knows that the message must be processed as if there were no MOCN involved. In other words, the Core Network processes the request as in a normal single operator network, and sends the normal Direct Transfer message to the RNC, the message including the signaling message destined for the terminal as a (non-access stratum-protocol data unit) NAS-PDU IE (step 307). The RNC then uses the downlink direct transfer procedure to carry the signaling message over the radio interface to the terminal (step 308). In the above first embodiment, an indication, such as a cause IE, is thus inserted into the message when forwarding the registration request to the last available CN.

Figure 4:
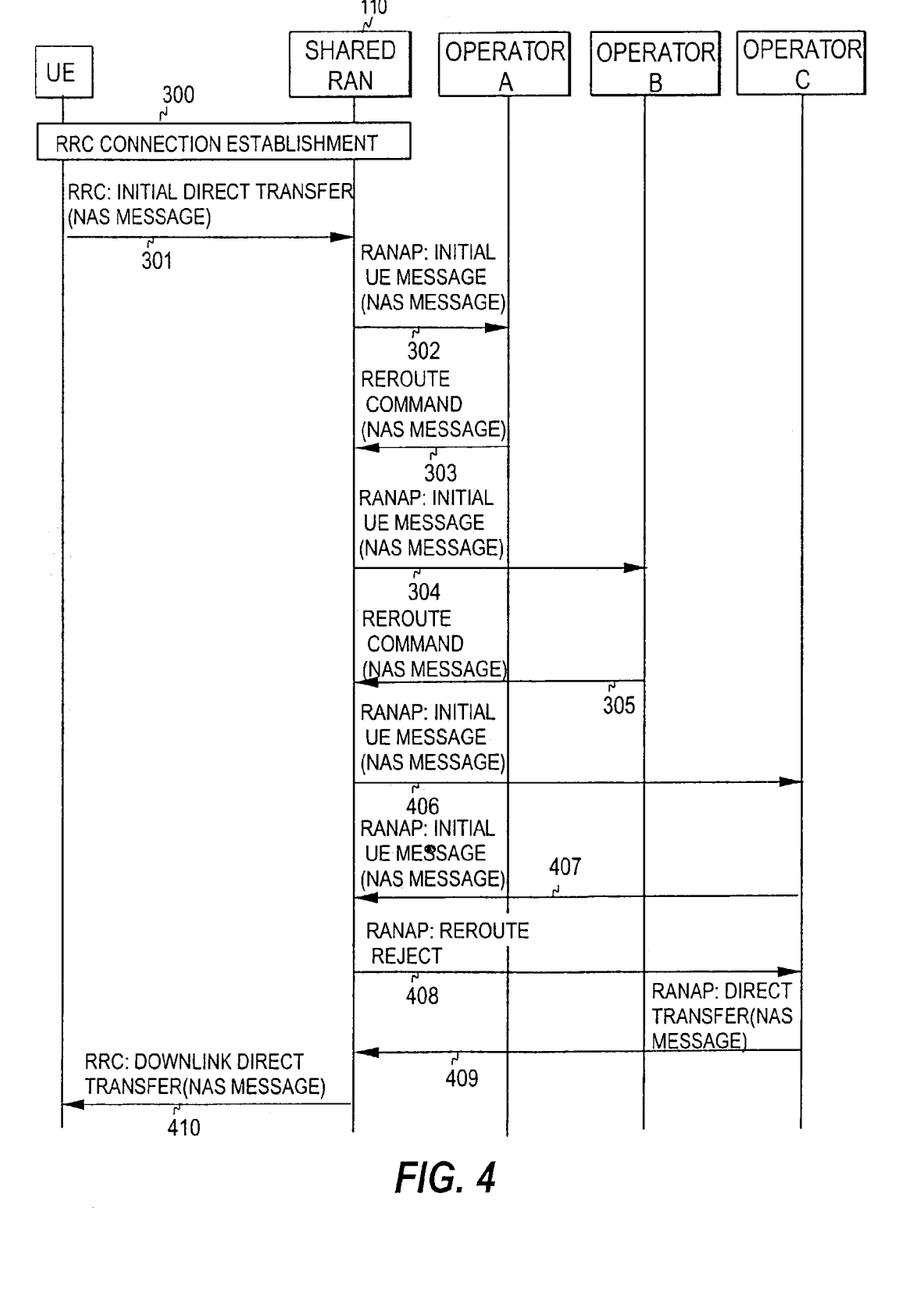
FIG. 4 illustrates the message exchange in a second embodiment of the invention.

FIG. 4 illustrates a second embodiment of the invention by showing the message exchange between the different entities in FIG. 2. The second embodiment corresponds otherwise to the first embodiment, except that in the second embodiment no cause IE is used in the initial UE message. Instead, a separate message is sent by the RNC to the last available Core Network, if the network tries to reroute the registration request. The message informs the Core Network that this time rerouting is not allowed, i.e. the separate message carries semantically the same information as the cause IE in the first embodiment. The steps 300 to 305 are thus similar in the two embodiments. Step 406 of the second embodiment differs from step 306 of the first embodiment in that in step 406 no cause IE is used in the initial UE message. Instead, the RNC sends a reroute reject message (step 408) in response to the reroute command received from the last available Core Network. When the Core Network receives this message, it knows again that the corresponding request must be processed as if there were no MOCN involved. Steps 409 and 410 then correspond to the above steps 307 and 308, respectively. The reroute reject message is a message according to the RANAP protocol, the type IE of the message indicating that a reroute reject is in question. As is illustrated in FIGS. 3 and 4, the NAS message is returned to the RNC in the reroute command, i.e. the NAS message is not stored in the RNC. The reroute reject message is thus the only message type shown in the figures that does not carry a NAS message within it.

In one embodiment of the invention, the first and second embodiments are combined so that both the "no rerouting allowed" indication of the first embodiment and the reroute reject message of the second embodiment are specified for the MOCN. The first embodiment allows signaling to be optimized while the second embodiment allows the MOCN to cover some abnormal situations in which a reroute command may still be received from a Core Network. Thus the above first and second embodiments are not exclusive solutions but can also be used simultaneously.

The service can be denied in the Core Networks for various reasons. For example, one Core Network may reject the registration request because of an overload situation in the network, while another CN may reject the request because it has no roaming agreement with the operator of the home network of the subscriber in question. It is therefore possible that the last available Core Network has no such roaming agreement, whereby the terminal is informed that roaming is not allowed, which is not correct, as the request was only temporarily rejected due to other reasons, such as current overload in the Core Network(s) allowing roaming. Since the information received from the Core Network that roaming is not allowed in this MOCN is stored in the terminal (U) SIM, which controls the network selection in the terminal, it is possible that the terminal does not any more try to register with the MOCN in question.

Figure 5:
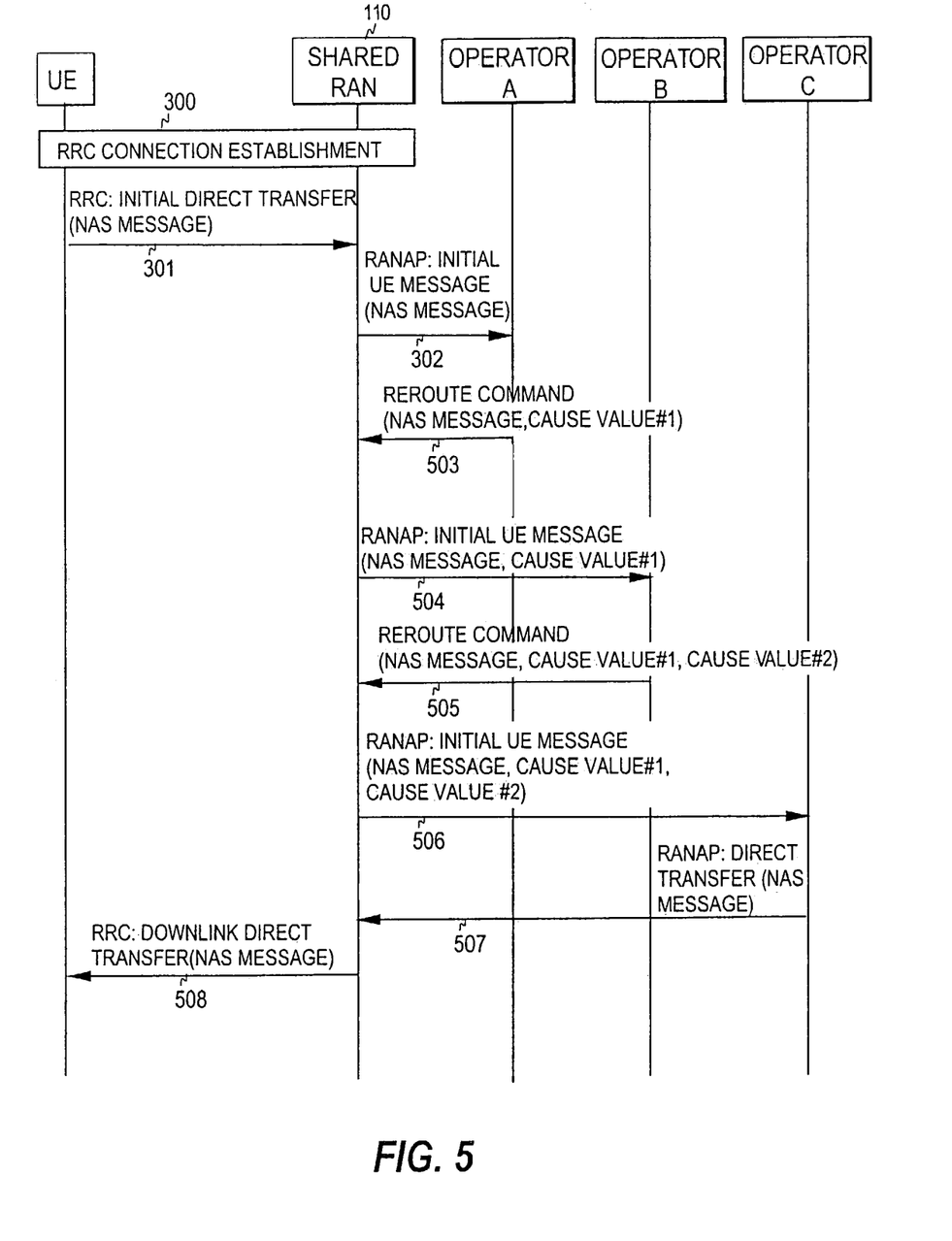
FIG. 5 illustrates the message exchange in a third embodiment of the invention.

To avoid the above-described situation, a Core Network informs the next attempted Core Network the reason why the registration request was rejected. This may be implemented by adding to the reroute command a cause value, indicating why rerouting has taken place. FIG. 5 illustrates this embodiment, by showing the message exchange between the different entities in FIG. 2. In this embodiment, each reroute command sent to the RNC by the Core Network includes a cause value indicating why the Core Network rejected the request (compare steps 503 and 505). The RNC forwards the cause value received from the Core Network to the next Core Network in the initial UE message, whereby each Core Network that receives the registration request also receives the information why the request was previously rejected by one or more Core Networks (compare steps 504 and 506). It is to be noted here that the cause values can be used in the embodiment of FIG. 3, in the embodiment of FIG. 4, or in the above-mentioned combined embodiment. In the example of FIG. 5, it is assumed that the second embodiment is used and that the last CN accepts the registration request.

Each Core Network uses the cause values when processing the request. Although the cause values may not affect the final decision of an individual Core Network (service accepted or rejected), the last Core Network is in each case able to indicate the correct reason for the rejection in the NAS message sent to the terminal through the RNC. This NAS message may be a Location Updating Reject or a Routing Area Update Reject, for example, which the CN sends within a Direct Transfer message. One or more cause values may be transferred to the next Core Network. In other words, a Core Network may just add its own cause value to the list of cause values, as is shown in FIG. 5, or it may define a new cause value on the basis of the cause value(s) it receives and its own cause value, and send only the defined new cause value to the next CN.

The transfer of the cause value(s) may be implemented for example by defining for the RANAP a transparent container for the CN-to-CN communication, similarly as the existing 'Source RNC to Target RNC Transparent Container' and 'Target RNC to Source RNC Transparent Container' have been defined for RNC-to-RNC communication. When the cause value is carried in such a container, no modifications are needed in the RNC even though new information is added to the container.

Thus in the present invention the (UT) RAN keeps track of the Core Networks to which the request has already been sent and which Core Networks are still available. Although these operations may be distributed, they are typically located in a single network element, such as the RNC.

Figure 6:
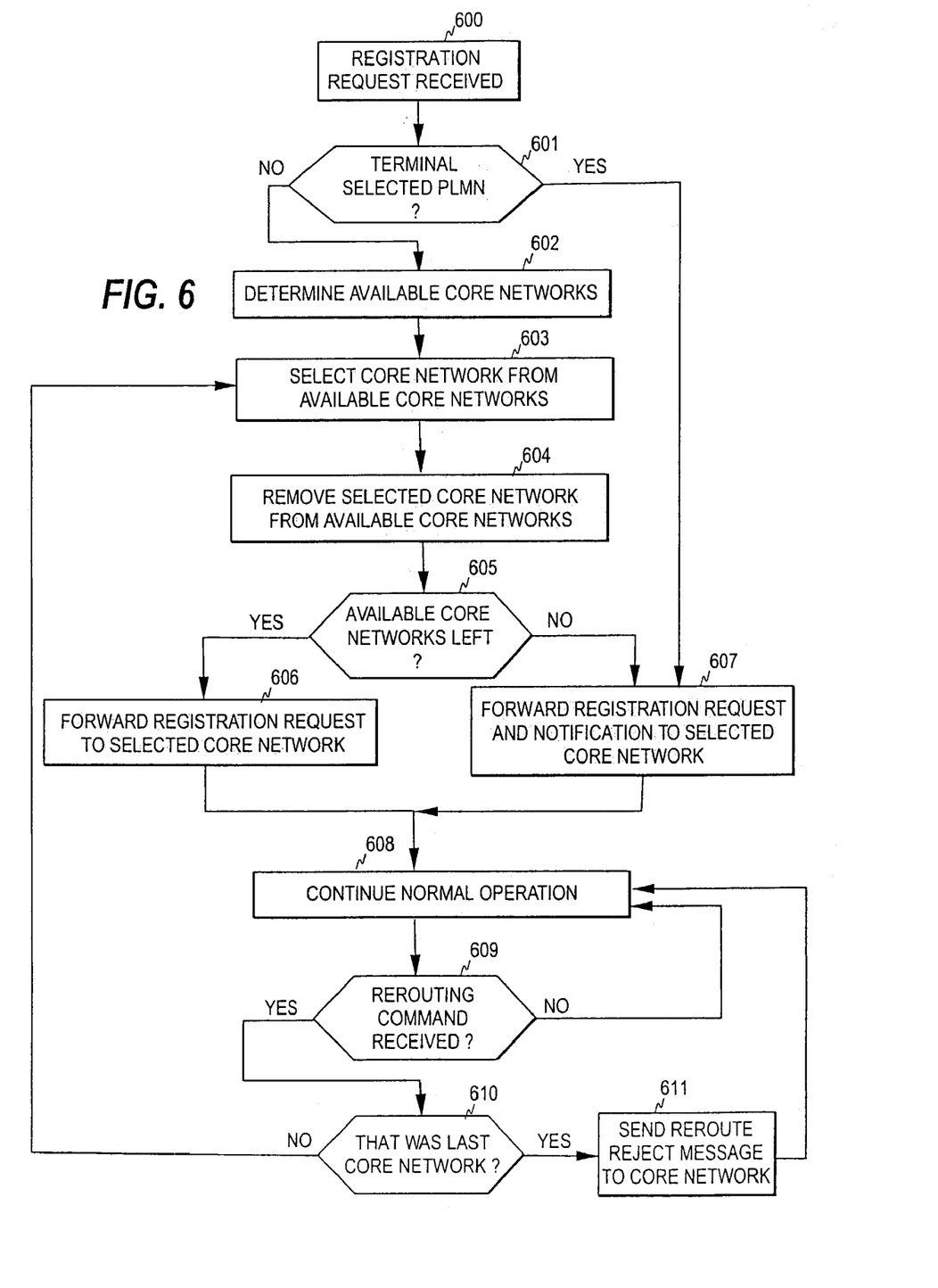
FIG. 6 is a flow diagram illustrating the operation of a Radio Network Controller.

FIG. 6 is a flow diagram illustrating an example of the operation of the RNC, assuming that the RNC operates according to the above-mentioned combined embodiment of the invention. When a registration message is received from a terminal (step 600), the RNC first examines whether the message indicates that the terminal has already selected a certain PLMN, i.e. a Core Network (step 601). If this is not the case, the RNC determines a set of available Core Networks (step 602). It is to be noted here that this set is not necessarily the same as the set of Core Networks connected to the Radio Access Network, since the RNC may already know that one or more of the Core Networks cannot, for some reason, serve the request in question.

The RNC then selects the first Core Network to which the request is to be transmitted and removes the selected Core Network from the set of available Core Networks in order to prevent the same Core Network from being selected again (steps 603 and 604). The RNC then examines whether there are available networks left in the set (step 605). If this is the case, the RNC forwards the request to the selected Core Network in the initial UE message (step 606). If there are no Core Networks left in the set of available Core Networks, i.e. if the selected Core Network is the last Core Network that may serve the request, the RNC inserts the cause IE in the message, the cause IE serving as a notification indicating that rerouting is not allowed for the CN (step 607). This step is also entered directly from step 601, if the RNC notices that the terminal has selected the serving PLMN.

The RNC then continues its normal operation (step 608) during which it also monitors (step 609) whether a reroute command is received, which may occur if the message sent to the Core Network did not include a cause IE. If this occurs, the RNC jumps to step 603 to select a new Core Network, provided that there are still Core Networks available, which is checked at step 610. If it is noticed at this step that the currently selected Core Network, which returned the reroute command, is the last available Core Network, a reroute reject message is sent to that Core Network (step 611). After this, and also if no reroute command is received from the selected Core Network, the operation continues as if the network had a single Core Network only.

As mentioned above, FIG. 6 illustrates the operation of an RNC according to the first embodiment of the invention. Generally, the RNC selects the set of available Core Networks and starts to forward the registration request to these Core Networks one by one in a certain order until one of the Core Networks accepts the request or until at least one predetermined criterion is fulfilled. If the criterion/criteria is/are met, the RNC informs the Core Network currently selected that rerouting is not allowed. In the above examples two separate criteria are used, each criterion triggering the sending of the "rerouting not allowed" information when fulfilled. The first criterion is fulfilled when there are no more Core Networks in the set of available Core Networks, while the second criterion is fulfilled if the RNC notices that a particular Core Network has already been selected as the serving Core Network by the terminal. Other, more complicated criteria may also be used to trigger the sending of the "rerouting not allowed" information. For example, the RAN may additionally analyze information received from outside of the RAN in order to decide whether the sending of the "rerouting not allowed" information is to be triggered. A particular Core Network may, for example, indicate that it is temporarily not available, whereby a predetermined criterion may be fulfilled if this occurs. The above-mentioned combined embodiment is suitable for a system like this; if the RNC has already sent the registration request to the second last Core Network, without indicating that rerouting is not allowed, when the last Core Network informs that it is not available, the RNC can send a reroute reject message to the second last Core Network if it returns a reroute command.

Generally, the triggering of the sending of the "rerouting not allowed" information requires that one or more predetermined criteria are met. If a certain decisive criterion is met, then there may be no need to analyze the statuses of the other criteria, but the sending of the "rerouting not allowed" information is triggered. However, the sending may also require that a certain combination of two or more predetermined criteria is met, as is the case in the above-described second embodiment: the reroute reject message is sent if there are no more available Core Networks and the last CN returns a reroute command.

The RNC may also temporarily change over to forced delivery of the registration requests, whereby the RNC does not wait for the reroute commands but inserts the "rerouting not allowed" information to each registration request. In other words, the first Core Network selected by the RNC must serve the registration request.

Figure 7:
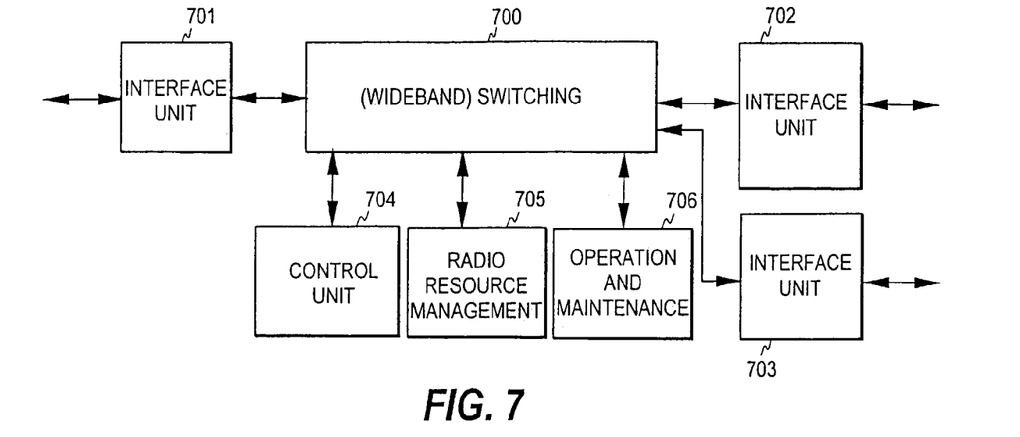
FIG. 7 is a schematic presentation of a Radio Network Controller.

FIG. 7 is a schematic illustration of the basic elements of the RNC. The core of the RNC is a switching unit 700, which is connected through a first interface 701 to the node B elements (base stations), through a second interface 702 to the Core Networks, and through a third interface 703 to other RNCs. The RNC further includes a control unit 704, a radio resource management unit 705, and an operation and maintenance unit 706. The radio resource management unit is responsible for the control of the radio resources of the node B elements (base stations) connected to the RNC, while the operation and maintenance unit serves as an interface to network management, enabling the operator to manage and configure the RNC from an external management system. The above-described functionalities of the invention may be implemented in the control unit.

Figure 8:
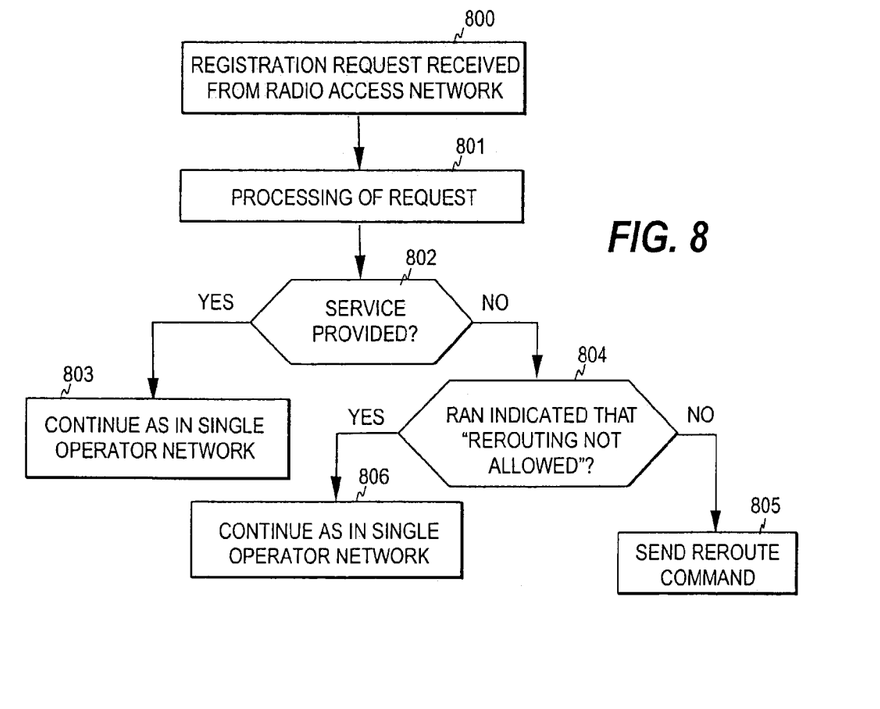
FIG. 8 is a flow diagram illustrating the operation of a Core Network element.

FIG. 8 is a flow diagram illustrating an example of the operation of the Core Network element communicating with an RNC. As is shown in FIG. 1, this network element is either an MSC/VLR or an SGSN. When a registration request is received from the Radio Access Network, the request is first processed and a decision is made whether the request can be served or not (steps 801 and 802). If the network element decides that the service can be provided, the processing of the registration request is continued as if no MOCN was involved (step 803). If the network element decides on the contrary that the service cannot be provided, the process continues depending on whether the "no rerouting allowed" indication is received in connection with the request. If the network element noticed at step 801 that the Radio Access Network informed (in the cause IE) that rerouting is not allowed, the process is continued as if no MOCN was involved (step 806). If no such indication is received, a reroute command, preferably provided with a cause value, is sent to the RNC (step 805). Steps 803 and 806 are shown as separate steps as the respective operations are different. At step 803, the network element sends an accept message (NAS message) to the RNC, while at step 806 a different NAS message is sent (reject).

Figure 9:
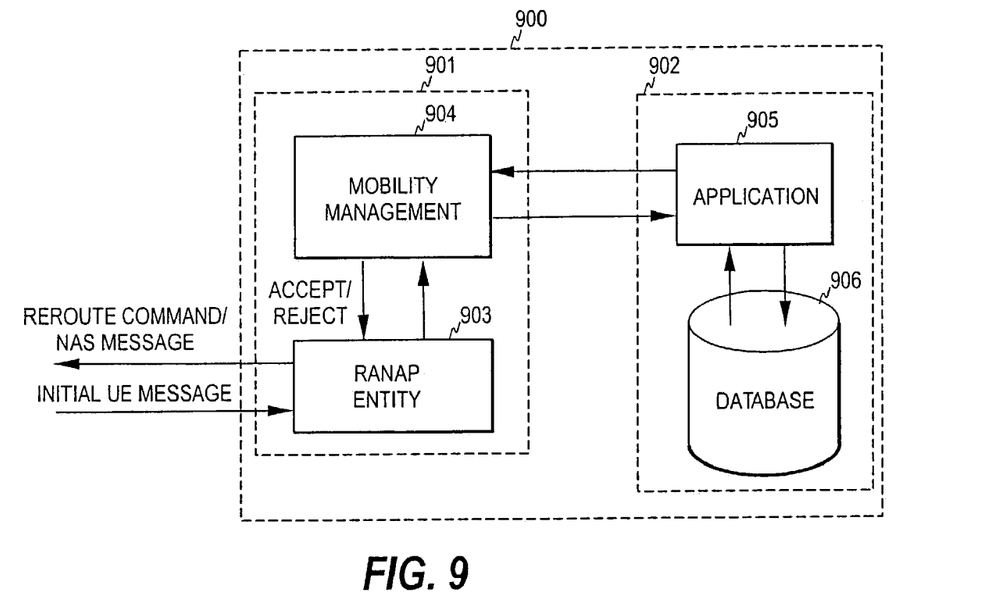
FIG. 9 is a schematic presentation of a Core Network element communicating with the Radio Network Controller.

FIG. 9 is a schematic illustration showing the elements of the MSC/VLR or SGSN relevant in view of the invention. The network element includes two logical units responsible for the functionalities of the invention: a layer 3 protocol controller 901 and a database 902. The controller includes a RANAP entity 903, which forms the interface towards the Radio Access Network, and a mobility management entity 904 that communicates with the database including a memory 906 and a database management application 905. The RANAP entity receives the initial UE messages from the Radio Access Network. The mobility management unit uses the database to process the request included in the message, in order to decide whether service is provided or not. Depending on the decision, the RANAP entity then sends the relevant NAS message or the reroute command to the Radio Access Network. The decision can be made in the mobility management entity or in the management application.

Although the invention was described above with reference to the examples shown in the appended drawings, it is obvious that the invention is not limited to these, but may be modified by those skilled in the art without departing from the scope and spirit of the invention. For example, the method of the invention may be applied to different types of networks shared by several operators.

The invention claimed is:

1. A method, comprising:
    receiving a registration request in a radio access network;
    in the radio access network, keeping track of core networks available for serving the registration request, wherein each core network belongs to a plurality of core networks;
    selecting a core network for the registration request, the selected core network belonging to the available core networks;
    forwarding the registration request to the selected core network; and monitoring a network-originated event that indicates that the selected core network is currently the only available core network, wherein in the radio access network, determining whether at least one predetermined criterion is fulfilled, wherein a fulfillment of the at least one predetermined criterion indicates that the event has occurred and therefore routing of the registration request to another core network is no longer allowed; and
    in response to the at least one predetermined criterion being fulfilled, notifying the selected core network from the radio access network that the registration request can only be served by the selected core network, wherein the radio access network is configured to control the selected core network, and the selected core network is forced to serve the registration request upon detection of the event.

2. The method according to claim 1, further comprising receiving a rerouting command from the selected core network, the rerouting command indicating that the registration request is to be routed to another core network.

3. The method according to claim 2, wherein selecting and forwarding are repeated in response to the rerouting command, whereby another core network is selected for the registration request.

4. The method according to claim 3, further comprising determining a set of core networks for serving the registration request, wherein the set indicates the core networks from among which a core network is selected for the registration request.

5. The method according to claim 4, further comprising monitoring the number of core networks left in the set after selecting, wherein the at least one predetermined criterion is fulfilled when the number of core networks drops to zero.

6. The method according to claim 2, wherein notifying includes sending a separate message to the selected core network, the message indicating that routing to another core network is not allowed.

7. The method according to claim 6, wherein the separate message is sent in response to the rerouting command.

8. The method according to claim 2, further comprising inserting a cause value in the rerouting command, the cause value indicating why the registration request is to be routed to another network.

9. The method according to claim 1, wherein notifying includes inserting an information element in a message carrying the registration request, the information element indicating that routing of the registration request to another core network is not allowed.

10. The method according to claim 9, wherein the information element is a cause Information Element according to a Radio Access Network Application Part.

11. The method according to claim 9, wherein notifying further includes sending a separate message to the selected core network, the message indicating that routing to another core network is not allowed.

12. The method according to claim 9, wherein the separate message is sent in response to the rerouting command.

13. The method according to claim 1, further comprising indicating the selected core network in the registration request, selecting being performed prior to receiving;
wherein the at least one predetermined criterion is fulfilled when the selected core network is indicated in the registration request.

14. A system, comprising:
a first interface configured to receive a registration request;
a tracker unit, in a radio access network, configured to keep track of core networks available for serving the registration request, wherein each core network belongs to a plurality of core networks;
a selector configured to select a core network for the registration request, the selected core network belonging to the available core networks;
a transmitter configured to forward the registration request to the selected core network;
a monitor configured to monitor a network-originated event that indicates that the selected core network is currently the only available core network, wherein a determiner is configured to determine whether at least one predetermined criterion is fulfilled, wherein a fulfillment of the at least one predetermined criterion indicates that the event has occurred and therefore routing of the registration request to another core network is no longer allowed; and
a notifier responsive to the monitor, configured to notify the selected core network from the radio access network that the registration request can only be served by the selected core network, wherein the radio access network is configured to control the selected core network, and the selected core network is forced to serve the registration request upon detection of the event.

15. The system according to claim 14, further comprising a second interface configured to receive a rerouting command from a core network.

16. The system according to claim 14, wherein the notifier unit is configured to insert an information element in a message carrying the registration request, the information element indicating that the registration request is to be served by the core network receiving the registration request.

17. The system according to claim 14, wherein the notifier unit is configured to send a separate message to the selected core network, the message indicating that the registration request is to be served by the core network receiving the registration request.

18. The system according to claim 16, wherein the notifier unit is further configured to send a separate message to the selected core network, the message indicating that the registration request is to be served by the core network receiving the registration request.

19. The system according to claim 14, wherein the first interface and the selector are in the radio access network.

20. The system according to claim 19, wherein the first interface, the selector, the transmitter, the monitor, and the notifier are fitted into a single network element.

21. The system according to claim 20, wherein the network element is a radio network controller.

22. The system according to claim 14, wherein the first interface is in the radio access network and the selector is in a mobile terminal configured to communicate with the radio access network, the selector being configured to attach an indication of the selected core network to the registration request.

23. An apparatus, comprising:
a first interface configured to receive a registration request from a radio access network;
a decision-maker, responsive to the first interface, configured to decide whether the registration request is to be served by the core network to which the apparatus belongs;
a transmitter, responsive to the decision-maker, configured to transmit a rerouting command to the radio access network, the rerouting command indicating that the registration request is to be routed to another core network,
wherein the first interface is configured to receive a notification from the radio access network, and the decision-maker is configured to decide, upon reception of the notification, that a certain registration request can only be served by the core network to which the apparatus belongs, wherein the decision that the certain registration request can only be served by the core network to which the apparatus belongs is based on a network-originated event that indicates that the core network to which the apparatus belongs is currently the only available core network, and wherein the radio access network is configured to control the core network to which the apparatus belongs, and the core network to which the apparatus belongs is forced to serve the registration request upon detection of the event.

24. The apparatus according to claim 23, wherein the transmitter is configured to insert a cause value in the rerouting command, the cause value indicating why the registration request is to be routed to another network.

25. An apparatus comprising:
first interface means for receiving a registration request;
a tracking means, in the radio access network, for keeping track of core networks available for serving the registration request, wherein each core network belongs to the plurality of core networks;
selection means for selecting a core network for the registration request, the selected core network belonging to the available core networks;
transmission means for forwarding the registration request to the selected core network;
monitoring means for monitoring a network-originated event that indicates that the selected core network is currently the only available core network, wherein in the radio access network, determining whether at least one predetermined criterion is fulfilled, wherein a fulfillment of the at least one predetermined criterion indicates that the event has occurred and therefore routing of the registration request to another core network is no longer allowed; and
notification means, responsive to the monitoring means, for notifying the selected core network from the radio access network that the registration request can only be served by the selected core network, wherein the radio access network is further configured to control the selected core network, and the selected core network is forced to serve the registration request upon detection of the event.

26. An apparatus comprising:
a first interface means for receiving a registration request from a radio access network;
decision-making means, responsive to the first interface means, for deciding whether the registration request is to be served by a core network to which the core apparatus belongs;
transmission means, responsive to the decision-making means, for transmitting a rerouting command to the radio access network, the rerouting command indicating that the registration request is to be routed to another core network, wherein the first interface means are configured to receive a notification from the radio access network, and the decision-making means is configured to decide, upon reception of the notification, that a certain registration request can only be served by the core network to which the apparatus belongs, wherein the decision that the certain registration request can only be served by the core network to which the apparatus belongs is based on a network-originated event that indicates that the core network to which the apparatus belongs is currently the only available core network, and wherein the radio access network is configured to control the core network to which the apparatus belongs, and the core network to which the apparatus belongs is forced to serve the registration request upon detection of the event.

27. An apparatus, comprising:

a first interface configured to receiving a registration request;

a tracker, in a radio access network, configured to keep track of core networks available for serving the registration request, wherein each core network belongs to a plurality of core networks;

a selector configured to select a core network for the registration request, the selected core network belonging to the available core networks;

a transmitter configured to forward the registration request to the selected core network;

a monitor configured to monitor a network-originated event that indicates that the selected core network is currently the only available core network, wherein in the radio access network, determining whether at least one predetermined criterion is fulfilled, wherein a fulfillment of the at least one predetermined criterion indicates that the event has occurred and therefore routing of the registration request to another core network is no longer allowed; and a notifier, responsive to the monitor, configured to notify the selected core network from the radio access network that the registration request can only be served by the selected core network, wherein the radio access network is further configured to control the selected core network, and the selected core network is forced to serve the registration request upon detection of the event.

* * * * *